United States Patent [19]

Kim et al.

[11] Patent Number: 5,139,407

[45] Date of Patent: Aug. 18, 1992

[54] APPARATUS FOR REDUCING THERMOPLASTIC MATERIAL COMPRESSION MOLD CYCLE TIME

[75] Inventors: Bang M. Kim; Donald E. Woodmansee, both of Schenectady, N.Y.

[73] Assignee: General Electric Company, Schenectady, N.Y.

[21] Appl. No.: 401,881

[22] Filed: Sep. 1, 1989

[51] Int. Cl.$^5$ ................................................. B29C 33/08
[52] U.S. Cl. ..................... 425/174.8 E; 264/26; 264/325; 425/185; 425/193; 425/384; 425/407; 425/411
[58] Field of Search ............... 425/183, 411, 384, 407, 425/182, 185, 186, 193, 195, 174, 174.8 R, 174.8 E; 264/320, 327, 26, 325

[56] References Cited

U.S. PATENT DOCUMENTS

| | | | |
|---|---|---|---|
| 2,920,172 | 1/1960 | Stallard | 264/DIG. 26 |
| 2,922,865 | 1/1960 | Schattler et al. | 264/26 |
| 3,545,044 | 12/1970 | Rebovich et al. | 425/186 |
| 3,553,784 | 1/1971 | Shuman | 425/158 |
| 3,671,624 | 6/1972 | Antalek | 264/327 |
| 3,804,362 | 4/1974 | Stromblad et al. | 249/78 |
| 4,018,552 | 4/1977 | Prast et al. | 425/407 |
| 4,134,942 | 1/1979 | Mirr et al. | 264/46.6 |
| 4,202,522 | 5/1980 | Hanas et al. | 425/186 |
| 4,225,109 | 9/1980 | Yotsutsuji et al. | 249/111 |
| 4,240,780 | 12/1980 | Carcey | 425/407 |
| 4,390,489 | 6/1983 | Segal | 264/126 |
| 4,402,657 | 9/1983 | Laghi | 425/183 |
| 4,416,604 | 11/1983 | Bender et al. | 425/183 |
| 4,490,321 | 12/1984 | Klinkaü | 425/411 X |
| 4,563,145 | 1/1986 | de Meij | 425/174.8 |
| 4,629,650 | 12/1986 | Kataoka | 425/817 R |
| 4,659,304 | 4/1987 | Day | 425/406 |
| 4,708,626 | 11/1987 | Sakai et al. | 425/398 |
| 4,714,421 | 12/1987 | D'Agostino | 425/195 |
| 4,744,849 | 5/1988 | Michaud-Soret | 156/245 |
| 4,769,202 | 9/1988 | Eroskey et al. | 264/166 |
| 4,773,839 | 9/1988 | Case et al. | 425/186 |
| 4,874,564 | 10/1989 | Sudani et al. | 425/411 X |

FOREIGN PATENT DOCUMENTS 2319477 4/1977 France .
572425 10/1945 United Kingdom ................ 264/26

OTHER PUBLICATIONS

News Watch, Mike Berins, Plastics World, Aug. 1987, p. 13 Dupont Article.
Polym. Plast. Technol. Eng., 26(1), 1–22 (1987), Rajesh R. Wadha et al., A New Approach to Low Thermal Inertia Molding.

Primary Examiner—Jay H. Woo
Assistant Examiner—Robert B. Davis
Attorney, Agent, or Firm—Patrick R. Scanlon; James C. Davis, Jr.; Paul R. Webb, II

[57] ABSTRACT

A thermoplastic sheet is placed between a pair of mold members each having a thermal insulator and a mating metal mold insert. RF energy is applied to the inserts to dielectrically heat and melt the thermoplastic sheet. The heated sheet is then deformed in a low pressure press with the insulators. The insulators are then replaced with cool thermally conductive structures to shorten the cooling cycle time. The thermally conductive structures cool the sheet by pressing the sheet in a high pressure press.

5 Claims, 3 Drawing Sheets

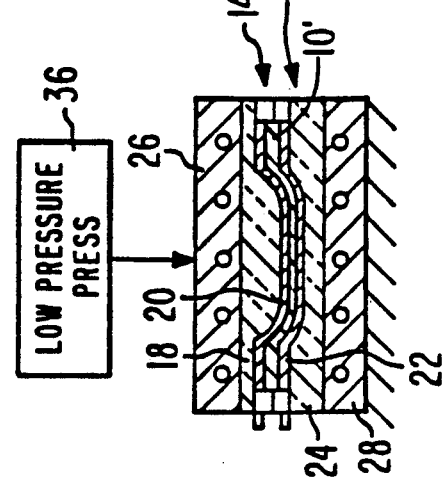
Fig. 1a
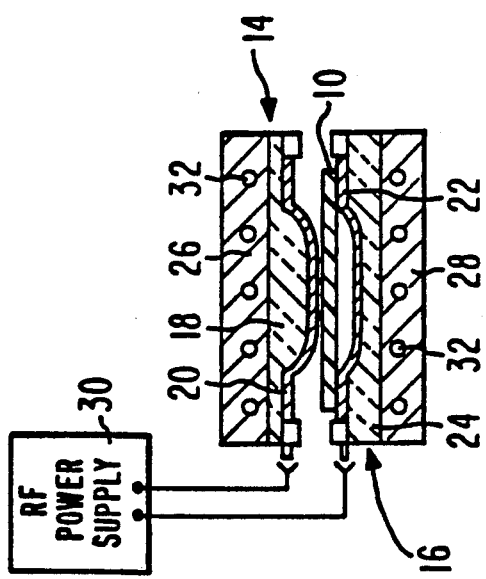
Fig. 1b
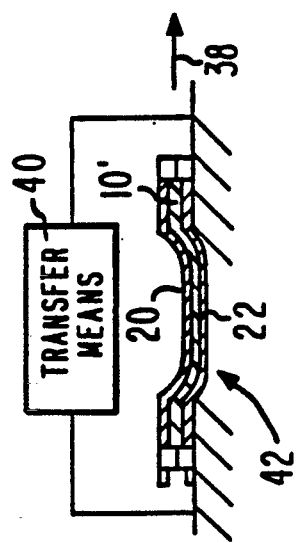
Fig. 1c
Fig. 1d
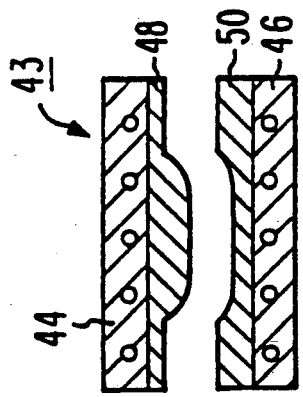
Fig. 1e

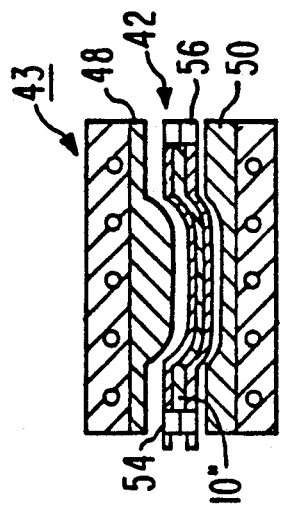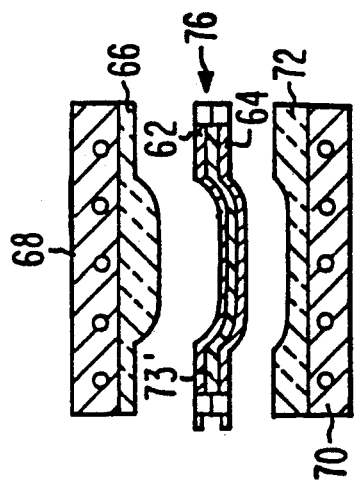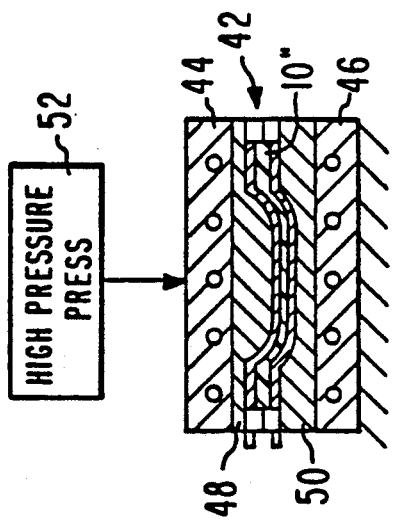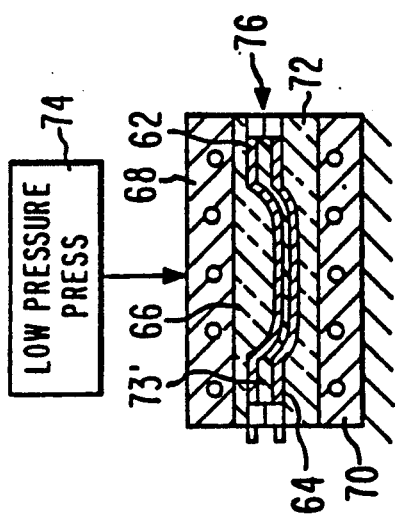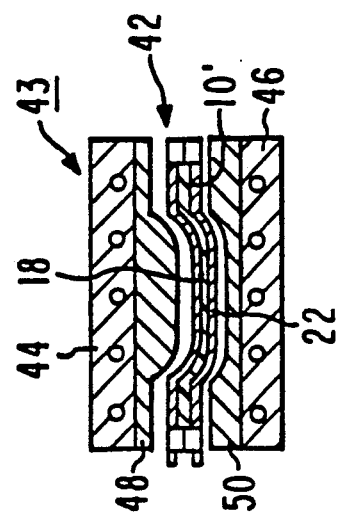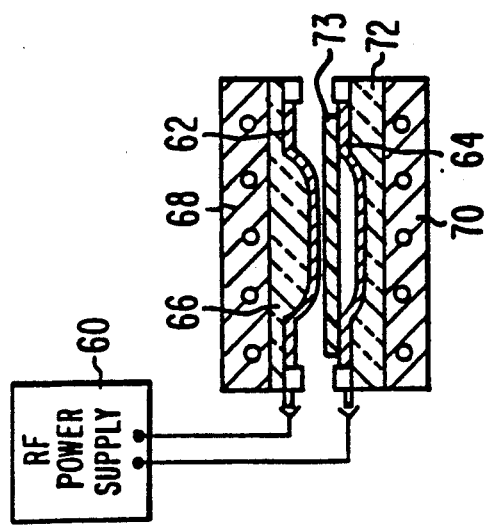

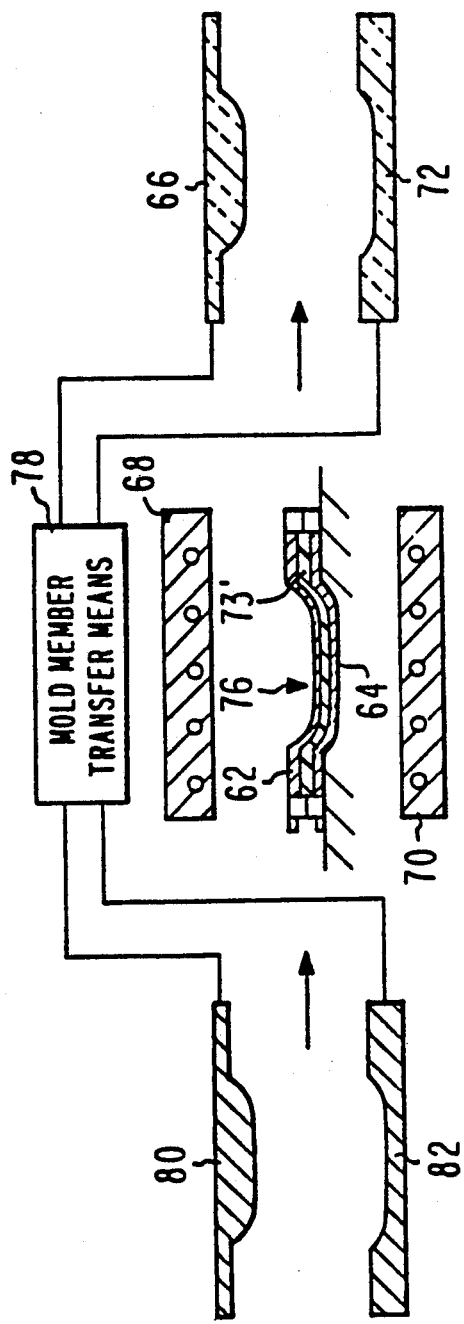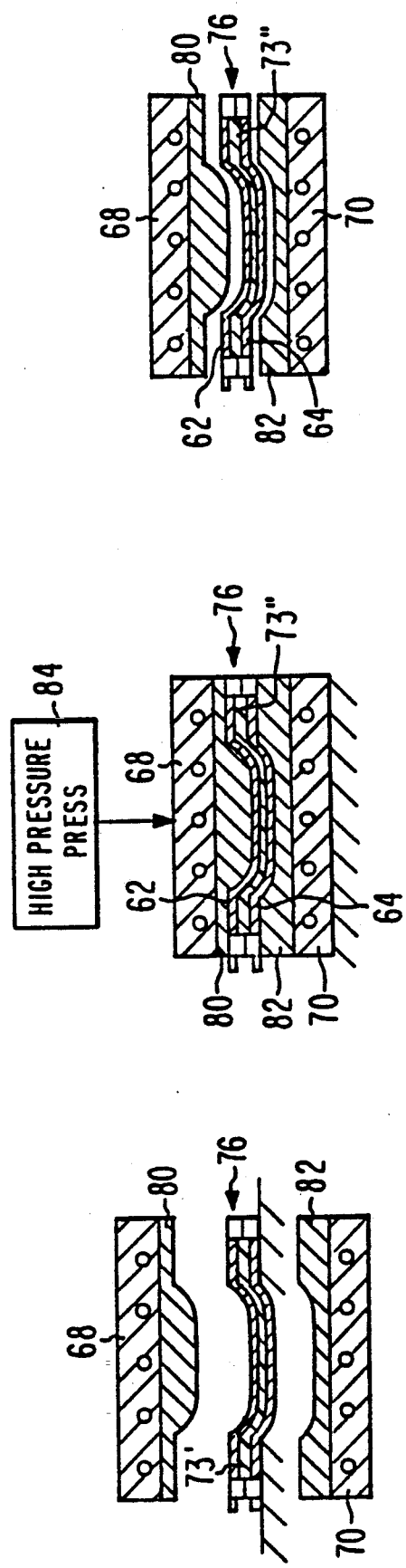

APPARATUS FOR REDUCING THERMOPLASTIC MATERIAL COMPRESSION MOLD CYCLE TIME

The present invention relates to molds for deforming thermoplastic material.

Of interest are copending applications Ser. No. 175,078 now abandoned filed Mar. 30, 1988 entitled, "Multilayer Composite Mold Structure for Molding on Hot Surfaces" in the name of B. M. Kim, Ser. No. 250,806 now abandoned filed Sep. 29, 1988 entitled "Apparatus for Blow Molding Parts with Smooth Surfaces", in the name of B. M. Kim, Ser. No. 357,829 now abandoned filed May 30, 1989 entitled "Apparatus and Method for Deforming Plastic Using Local RF Heating" in the name of Kim et al., Ser. No. 176,114 now abandoned filed Mar. 30, 1988 entitled "Compression Molding of Composite Parts on Hot Mold Surfaces with a Short Cycle Time" in the name of B. M. Kim, Ser. No. 380,353 now abandoned filed Jul. 17, 1989 entitled "Apparatus and Method for Deforming Thermoplastic Material Using RF Heating", in the name of Konrad et al., Ser. No. 253,513 now abandoned filed Oct. 5, 1988 entitled "Method and Apparatus for Molding Plastics on Hot Surfaces Using Dielectric Heating", in the name of Kim, Ser. No. 379,760 now abandoned filed Jul 14, 1989 entitled, "Apparatus and Method for Deforming Thermoplastic Material Using RF Heating", in the name of Choi et al., and U.S. Pat. No. 4,716,072 in the name of B. M. Kim, all of the above being assigned to the General Electric Company.

The use of glass reinforced thermoplastic sheets is a promising method for producing relatively thin, wide and strong parts such as car hoods, doors and panels. One important prerequisite for the use of gass reinforced composite products in automobile applications is a Class A Surface. While there is no universally accepted specification, the Class A surface is a glossy, smooth and polished surface which should be as smooth as that of current automobile exterior parts made from sheet metal.

Current molding processes of glass reinforced thermoplastic composite sheets begin with heating the composite blanks. The blanks may be heated in an oven, typically in infrared or hot air convection ovens as disclosed in copending application Ser. No. 176,114 or, in the alternative, as disclosed in copending applications Ser. Nos. 253,513, 253,836, now abandoned, 380,353 now abandoned and 379,760 now abandoned the blanks may be heated by dielectric heating using radio frequency signals or induction heating. The material is heated above its melting point, if crystalline or, if amorphous, at least substantially above its glass transition temperature. The hot blanks are then pressed between cool mold surfaces (surfaces lower than the melting point or the glass transition temperatures), which are typically in the range of 175°-250° F.

When the composite blanks are heated, they expand (loft) due to the latent recoil forces within the fibers. The surface of the expanded banks then cools during its transfer to the mold, resulting in "frozen" resins on the surface. Compression of a blank by the relatively cooler mold produces surfaces which are not completely filled with resins, although some hot molten material moves from the inner core to the Surface. The molded surface then has unfilled areas and exposed fibers creating surface roughness. Since the resin at the cold surface is frozen and does not flow, rough boundaries between charged and newly formed areas are also produced. The exposed fibers, porous areas and blank boundaries are the major manifestations of surface roughness, although other physical processes such as differential thermal shrinkage between fibers and resins can also result in surface roughness and/or waviness.

As disclosed in aforementioned copending application Ser. No. 250,806, smooth surfaces can be obtained from neat resin (pure resin) in blow molding by keeping the mold surface hot. The resin is supplied hot to the mold as a parison in blow molding. A commercial technique, which is based on temperature cycling of mold surfaces using heating and cooling fluids, increases the cycle time of the process. To provide enhanced surface characteristics several of the copending applications describe the use of insulation layers in the mold. However, these layers reduce the heat transfer rate and increase the cooling time (all other factors being the same), so the overall cycle time might increase also.

In Ser. No. 176,114 a reduced cycle time is disclosed. A composite thermoplastic blank sheet is heated in a convection or infrared oven. The preheating is disclosed as allowing the blank sheet to soften to conform to the contours of two mating mold inserts which overlay the blank on upper and lower surfaces after the blank is heated. The blank is further heated by heating elements in the inserts until the blank temperature exceeds the glass transition temperature if an amorphous resin is used or the melting temperature if a crystalline resin is used. The inserts and blank are then inserted in a cold mold to deform the blank to the desired shape. However, it would be an advantage to provide improved surface characteristics to the molded blank and yet provide a reduced cycle time.

An apparatus and method for deforming thermoplastic material in accordance with the present invention for reducing mold cycle time includes first means for deforming heated thermoplastic material with a pair of thermally insulating mold members and second means for cooling said deformed heated thermoplastic material with a pair of thermally conductive mold members.

BRIEF DESCRIPTION OF THE DRAWING

FIGS. 1a–1h illustrate the different stages of molding a thermoplastic sheet material in accordance with one embodiment of the present invention; and FIGS. 2a–2g illustrate apparatus and method in accordance with a second embodiment of the present invention for compression molding a thermoplastic material.

DETAILED DESCRIPTION OF THE INVENTION

In FIG. 1a, a composite thermoplastic resin sheet 10 is supported between two mold members 14 and 16 which are shaped complementary to deform the sheet 10 in accordance with the Contours of the members 14 and 16. The sheet 10 can comprise, for example, approximately 30–40% glass fiber mat and 60–70% polymer resin. The glass fiber mat can be fabricated from continuous strands sized with a sizing compatible with a matrix resin being used. Depending on the implementation, a variety of polymer matrices such as polycarbonate, polyesters, polypropylene, polyamide, polyimides, polyphenylene oxide, polystyrene, and blends of the above can be used.

Member 14 comprises a thermal insulator 18 and a metal insert 20 which is contoured the same as the insulator 18 to provide an integral structure. A mating metal insert 22 is secured to a second thermal insulator 24. Insulator 18 is secured to mold platen 26 and insulator 24 is secured to mold platen 28. The members 14 and 16 are located at a press (not shown in this figure) between cooler upper and lower mold platens 26 and 28. The mold platens 26 and 28 can comprise tool steel or a softer less expensive material such as aluminum or plastic composites. Since the mold inserts 20 and 22 are used in direct contact with the composite sheet 10, the mold platens are not subjected to wear by the material to be molded. The mold platens 26 and 28 are maintained at approximately 150°-250° C. by cooling liquid passing through passageways 32 in the mold platens.

The inserts 20 and 22 make direct contact with the sheet 10 for deforming the sheet. The inserts 20 and 22 are fabricated from a material which, together with insulators 18 and 24, can withstand the imposed compression forces at elevated temperatures at which the thermoplastic material melts without distortion. Each insert has a contoured surface for shaping the sheet material. Examples of materials forming the inserts include metals in this embodiment for reasons to be explained but could be other materials in different implementations. Insulators 18 and 24 are thermally insulating structures as disclosed, for example, in several of the aforementioned copending applications such as Ser. Nos. 175,078, 253,513, and others.

An RF power supply 30 applies an RF voltage to the inserts 20 and 22. The RF energy creates an RF AC electric field between the inserts 20 and 22 which serve as RF electrodes. This RF field causes resins in the sheet to generate heat, thereby softening the sheet 10 to a temperature above its glass transition temperature if amorphous, or above its melting point, if crystalline, in a manner described, for example, in copending applications Ser. Nos. 380,353 and 379,760 among others. In some cases it may be of value to both preheat the sheet and add final heat to the sheet by RF means.

Thermoplastic resins inherently possess some degree of sensitivity to RF radiation, though the degree of sensitivity varies between the many species of resins. Thus, the sensitivity of a composite to RF radiation can be enhanced by the addition of RF sensitive material having a greater RF sensitivity than the composite. For purpose of simplicity of illustration however, it is assumed that the thermoplastic sheet 10 inherently possesses RF radiation sensitivity and an RF sensitive material is not added thereto. RF sensitive polymer thermoplastics include acrylics, polyamide thermoplastics sold under the trademark NYLON by E. 1. Dupont Company, Inc., polybutylene terephthalate, sold under the trademark VALOX by the General Electric Company, a blend of polycarbonate and polybutylene terephthalate sold under the trademark XENOY by the General Electric Company, PVC (polyvinyl chloride), and polyvinyl acetate and polyacrylonitriles.

Organic activators may be added to thermoplastics having low RF sensitivity. For example, such plastics include TEFLON, a polytetrafluoroethylene sold by and a trademark of E. I. Dupont Co, Inc., a polycarbonate thermoplastic known as LEXAN, a mixture of high impact polystyrene and polyphenylene oxide known as NORYL, all registered trademarks of and available from the General Electric Company, or a polyolefin such as polyethylene or polypropylene. Organic examples of certain activators include triethanol amine, glycols, and glycerin.

Some inorganic materials which increase RF sensitivity are carbon particles, metals such as aluminum, metal oxides such as iron oxide and zinc oxide, aluminum silicates such as bentonite and clays, and fly ash. There are also commercially available sensitizers such as sold under the trademarks, FREQUON B-30 and FREQUON B-31 by the Struktol Co.

If an active RF activator is employed, it is assumed for purpose of illustration that the activator is uniformly distributed throughout the sheet 10 to make it uniformly sensitive to an RF field for creating heat by the dielectric heating phenomena. In other embodiments, the activator may be non-uniformly distributed as shown by way of example in co-pending application Ser. No. 357,829 mentioned above.

In FIG. 1b, a low pressure press 36 compresses the two mold platens 26 and 28 with the mold members 14 and 16 and the heated, softened thermoplastic sheet 10 therebetween to initially deform the sheet into the shape of component 10'. The sheet may also be further heated by RF energy during the low pressure press (the RF source not being shown in FIG. 1b). The low pressure press produces a resin surface with good surface characteristics. The insulators 18 and 24 insulate the deformed component 10' from the cooling effects of the cooler mold platens 26 and 28. This insulation prevents rapid cooling of the deformed sheet 10' during the low pressure deformation process. As a result, the surfaces of the sheet 10 as it is being formed into the component 10' remain hot due to reduced thermal conduction of heat from component 10' to the cooled mold platens. The insulators 18 and 24 also prevent the heat at the higher temperature in the RF heated sheet 10, during the deformation into component 10', from being rapidly conducted to the mold platens 26 and 28. The surface of the sheet 10 as it is being deformed reheats via the heat from the hotter core of the sheet which maintains the surface of the sheet in the molten state during the low pressure press. Therefore, the sheet 10 remains in the molten state throughout the deformation process of FIG. 1b avoiding the generation of surface voids and other surface defects which otherwise might occur with cooler mold surfaces.

In FIG. 1c, the mold platens 26 and 28 and insulators 18 and 24 are separated from the inserts 20 and 22, respectively. The insulators 18 and 24 remain attached to their respective mold platens. The inserts 20 and 22 with the deformed component 10' sandwiched therebetween are held together by clamps and form an assembly 42 supported by means not shown. The assembly 42 is transported in the direction of arrow 38 by transfer means 40, FIG. 1d, to a second mold 43, FIG. 1e. In FIG. 1e, the second mold 43 comprises two mold platens 44 and 46 and thermally conductive metal mold members 48 and 50, at the same temperature as platens 26 and 28, FIG. 1a, and respectively secured to mold platens 44 and 46. The mold platens 44 and 46 may be made of tool steel, aluminum or other thermally conductive materials.

In FIG. 1f, the assembly 42 is placed between the mold members 48 and 50. In FIG. 1g, a high pressure press 52 compresses mold halves 44 and 46 together forming the deformed sheet 10' into final component 10''. The high pressure press consolidates the cooler sheet to remove internal voids and remove trapped gas. At this point the cooling effect of the thermally conductive mold members 48 and 50 does not have an effect on the surface condition of the component 10'' during the high pressure press because the resins at the surface have at this time frozen in place during the low pressure press cycle of FIG. 1b and during the transfer cycle of FIGS. 1c and 1d. Component 10' during the transfer cools somewhat but still remains sufficiently soft so that it can be flowed to form the fully consolidated component 10" during the high pressure press cycle of FIG. 1g.

In FIG. 1h, the mold 43 is operated to release the assembly 42, comprising component 10" and inserts 20 and 22, from the thermally conductive mold members 48 and 50. In a subsequent step, the assembly 42 is removed from the mold, the inserts 20 and 22 separated and the component 10" separated from the inserts. It should be understood that the inserts 18 and 22 of FIGS. 1b-1h are clamped together by clamps 54 and 56 at the time of the low pressure press, FIG. 1b. The clamps preclude separation of inserts 10 and 22 during the entire process until at the end of the process, the clamps 54 and 56 are released to release the component 10".

An important aspect of the process as described above is that the advantages of using insulating mold members during the initial mold low pressure press cycle enables the thermoplastic material to deform while maintaining a good surface finish on the thermoplastic material to avoid the problems with cold mold pressing in prior art systems. Thermally conductive mold members 48 and 50 rapidly cool the inserts thermoplastic component assembly 42 to reduce the cycle time as compared to the cycle time that would occur employing the thermally insulating mold members of FIG. 1c during cooling. While the thermal insulating mold members of FIG. 1b serve the important purpose of maintaining the surface quality of the component during compression deformation, the disadvantage of such insulators 18 and 24 is that they would require a relatively longer cycle time for permitting the deformed component to cool sufficiently to be removed from the mold. To meet this concern, the thermally conductive mold members 48 and 50 rapidly cool the deformed component decreasing the cycle time significantly.

In FIGS. 2a-2g an alternative embodiment is disclosed wherein the insulating mold members comprising structures 14 and 16 are replaced with thermally conductive structures rather than transporting the insert component assembly to a separate press. In FIG. 2a, RF power supply 60 applies RF power to metal inserts 62 and 64. Insert 62 is supported via thermally and electrically insulating insulator 66 and mold platen 68. Insert 64 is secured to mold platen 70 via thermal insulator 72. In FIG. 2b, a low pressure press 74 compresses the sheet 73, FIG. 2a, forming initially deformed component 76. In FIG. 2c, the two mold platens 68 and 70 are separated. This frees the assembly 76 comprising inserts 62 and 64 and deformed component 73' from insulators 66 and 72. It should be understood that the assembly 76 is supported at this point by an additional structure (not shown). In FIG. 2d, the two insulators 66 and 72 are removed from the mold by a mold member transfer means 78. The mold member transfer means 78 also positions thermally conductive mold member structures 80 and 82 to be respectively attached to the upper and lower mold platens 68 and 70, FIG. 2e. During this period the component 73' and insert assembly 76 are maintained in position in the mold.

In FIG. 2f, a high pressure press 84 compresses the mold platens 68 and 70 toward one another. Thermally cool mold members 80 and 82 finally cool the component 73' forming component 73". The thermally conductive mold members 80 and 82 rapidly conduct the heat away from the assembly 76 comprising inserts 62 and 64 and the thermoplastic deformed component 73", decreasing the cycle time over that required to cool insulators 66 and 72 if remaining in place.

In FIG. 2g, the mold platens 68 and 70 are separated to free the assembly 76 so that the component 73" may be removed from therebetween.

What is claimed is:

1. An apparatus for deforming thermoplastic material into finished parts comprising:

an upper platen and a lower platen;

a first pair of mold members adapted to be removably disposed between said upper and lower platens;

a second pair of mold members adapted to be removably disposed between said upper and lower platens, said second pair of mold members having a higher thermal conductivity than said first pair of mold members;

mold member transfer means for selectively replacing one of said pairs of mold members with the other of said pairs of mold members; and a pair of metal inserts defining molding surfaces between which the material to be deformed is placed, said metal inserts being situated between the selected pair of mold members.

2. The apparatus of claim 1 further comprising a radio frequency power supply adapted to be attached to said metal inserts for heating the material to be deformed.

3. The apparatus of claim 1 wherein said upper and lower platens include cooling passages therein.

4. The apparatus of claim 1 wherein said metal inserts have the desired shape of a finished part.

5. An apparatus for deforming thermoplastic material into finished parts comprising:

an upper platen and a lower platen;

a pair of thermally insulating mold members adapted to be removably disposed between said upper and lower platens;

a pair of thermally conductive mold members adapted to be removably disposed between said upper and lower platens;

mold member transfer means for selectively replacing one of said pairs of mold members with the other of said pairs of mold members; and a pair of metal inserts defining molding surfaces between which the material to be deformed is placed, said metal inserts being situated between the selected pair of mold members, wherein said thermally insulating mold members hinder heat transfer between said metal inserts and said platens and said thermally conductive mold members allow heat transfer between said metal inserts and said platens.

* * * * *